United States Patent
Middha et al.

(10) Patent No.: US 7,680,778 B2
(45) Date of Patent: Mar. 16, 2010

(54) SUPPORT FOR REVERSE AND STEMMED HIT-HIGHLIGHTING

(75) Inventors: Bhuvan Middha, Redmond, WA (US); Girish Kumar, Redmond, WA (US); Gaurav Sareen, Bellevue, WA (US); Janine Crumb, Seattle, WA (US); Jason Douglas, Kirkland, WA (US); Silviu Petru Cucerzan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 11/625,076

(22) Filed: Jan. 19, 2007

(65) Prior Publication Data

US 2008/0177717 A1 Jul. 24, 2008

(51) Int. Cl.
*G06F 7/00* (2006.01)
(52) U.S. Cl. ............................................. 707/3
(58) Field of Classification Search ................. 707/3
See application file for complete search history.

(56) References Cited

U.S. PATENT DOCUMENTS

| | | | |
|---|---|---|---|
| 5,325,298 A | 6/1994 | Gallant | |
| 5,619,709 A | 4/1997 | Caid | |
| 6,625,599 B1 | 9/2003 | Bera | |
| 6,839,702 B1 | 1/2005 | Patel | |
| 7,028,024 B1 | 4/2006 | Kommers | |
| 7,051,017 B2 | 5/2006 | Marchisio | |
| 2002/0032632 A1* | 3/2002 | Sernet | 705/37 |
| 2004/0034629 A1* | 2/2004 | Genser | 707/3 |
| 2005/0216457 A1* | 9/2005 | Walther et al. | 707/4 |
| 2005/0256866 A1* | 11/2005 | Lu et al. | 707/5 |
| 2006/0041530 A1* | 2/2006 | Milic-Frayling et al. | 707/2 |
| 2006/0059138 A1 | 3/2006 | Milic-Frayling | |
| 2006/0161520 A1 | 7/2006 | Brewer | |
| 2006/0277167 A1* | 12/2006 | Gross et al. | 707/3 |

FOREIGN PATENT DOCUMENTS

WO WO2006094557 A1 9/2006

OTHER PUBLICATIONS

"See SearchWords" Search Engine Word Highlighter, PHD Computer Consultants, Ltd., 2005-2006, 13 pp., www.phdcc.com/seesearchwords/.
"Superior Search 2005" User Guide, NeuroPower Technologies, 2005, 101 pp., www.superiorsearch.com/download/manual/superior_search_manual_EN.pdf.

* cited by examiner

*Primary Examiner*—Charles Rones
*Assistant Examiner*—Fazlul Quader
(74) *Attorney, Agent, or Firm*—Shook, Hardy & Bacon LLP

(57) ABSTRACT

Computerized methods and systems for generating a suggested query list with suggested search terms displayed as highlighted text utilizing a user-defined query are provided. Query search terms are received by a user-interface display. Upon inputting query search terms, the user-interface automatically generates a suggested query list. The suggested query list is associated with the query search term and the suggested query list is comprised of at least one suggested search term. A query suggestion architecture determines if the query search term and the suggested search term are a match, and if so, highlights the suggested search term that is not a match. The user interface displays the highlighted terms to assist in refining a search. The present invention further provides a stemming algorithm that extracts the root form of the query search term.

20 Claims, 11 Drawing Sheets

SUPPORT FOR REVERSE AND STEMMED HIT-HIGHLIGHTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In hypermedia systems preceding the Web, and on the Web since its inception, users have employed a variety of tools to aid in navigating available information. For example, users often utilize search engines specifically designed for information retrieval. Additionally, more advanced search engines assist Web searching by providing features related to distinguishing terms returned on the search results page. One class of features is hit-highlighting. The hit-highlighting feature will "highlight" terms within the documents returned by the search engine that match the initial search query terms. Highlighting typically sets apart the search query terms in bolded text such that the user may easily determine where the search query was matched.

The hit-highlighting feature can facilitate a search procedure by allowing users, who desire to identify terms in titles of documents, to quickly locate the matched search query terms. However, the present method of hit-highlighting does not produce or display related search terms that may be suggested by the search engine server. In addition, providing highlighting to displayed terms similar to initial search query terms precludes the rapid navigation of the related search terms when refining the initial search query criteria. Accordingly, standard hit-highlighting has been limiting to Web users.

Therefore, there is a need in the art for computerized methods and systems for attaining related search terms, as suggested by a search engine, which incorporate the hit-highlighting feature. Further, there is a need to provide a method for easily navigating related search terms, thus, allowing a user to focus on a broad initial search query.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computerized methods and systems for determining if there exists a match upon comparing query search terms and suggested search terms. When a user inputs a user-defined query, the query having query search terms, s/he will be provided a display of the suggested search terms, wherein the unmatched suggested search terms are highlighted. Also, a stemming feature that determines the root form of the query search terms provides additional matched terms. Embodiments of the present invention further provide computer-readable media having computer-executable instructions thereon for performing the methods described herein.

Accordingly, embodiments of the present invention provide computer-readable media having computer-executable instructions embodied thereon for performing a method for highlighting a suggested search utilizing a query search term. In one embodiment, the method includes automatically generating a suggested query list that is associated with the query search terms. The suggested query list is comprised of suggested search terms that are compared against the query search terms to determine matches. The unmatched suggested search terms are highlighted. If desired, the method may further include stemming the query search term to a root form, appending a tag to the unmatched suggested search term, and displaying the tagged suggested search term as highlighted text.

Embodiments of the present invention further provide computer systems for generating a suggested query list with highlighted text utilizing a query search term. In one embodiment, the system includes a query receiving module, a query suggestion list generating module, a query matching module, and a highlighting module. The query receiving module is configured to receive the query search term. The query suggestion list generating module is configured to generate the suggested query list, wherein the suggested query list is associated with the query search term, and the suggested query list has a suggested search term. The query matching module is configured to determine if the query search term and the suggested search term are a match. The highlighting module configured to highlight the suggested search term that is not a match. If desired, the computer system may further include one or more of a root form extracting module configured to stem the query search term to a root form of the query search term; a query search term capturing module configured to separate and normalize the query search term associated with a user-defined query; a suggested query building module configured to compile a data structure comprised of alternate queries; and a display module configured to display the suggested query list on a search results Web page.

Additional embodiments of the present invention provide computerized methods for highlighting a suggested search term associated with a query search term. In one embodiment, the method includes receiving the query search term, populating a suggested query list from a data structure comprised of alternate queries, wherein the alternate queries are associated with the query search term and the suggested query list has a suggested search term, determining if the query search term and the suggested search term are a match, and highlighting the suggested search term that is not a match.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this specification. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Exemplary Operating Environment

Figure 1:
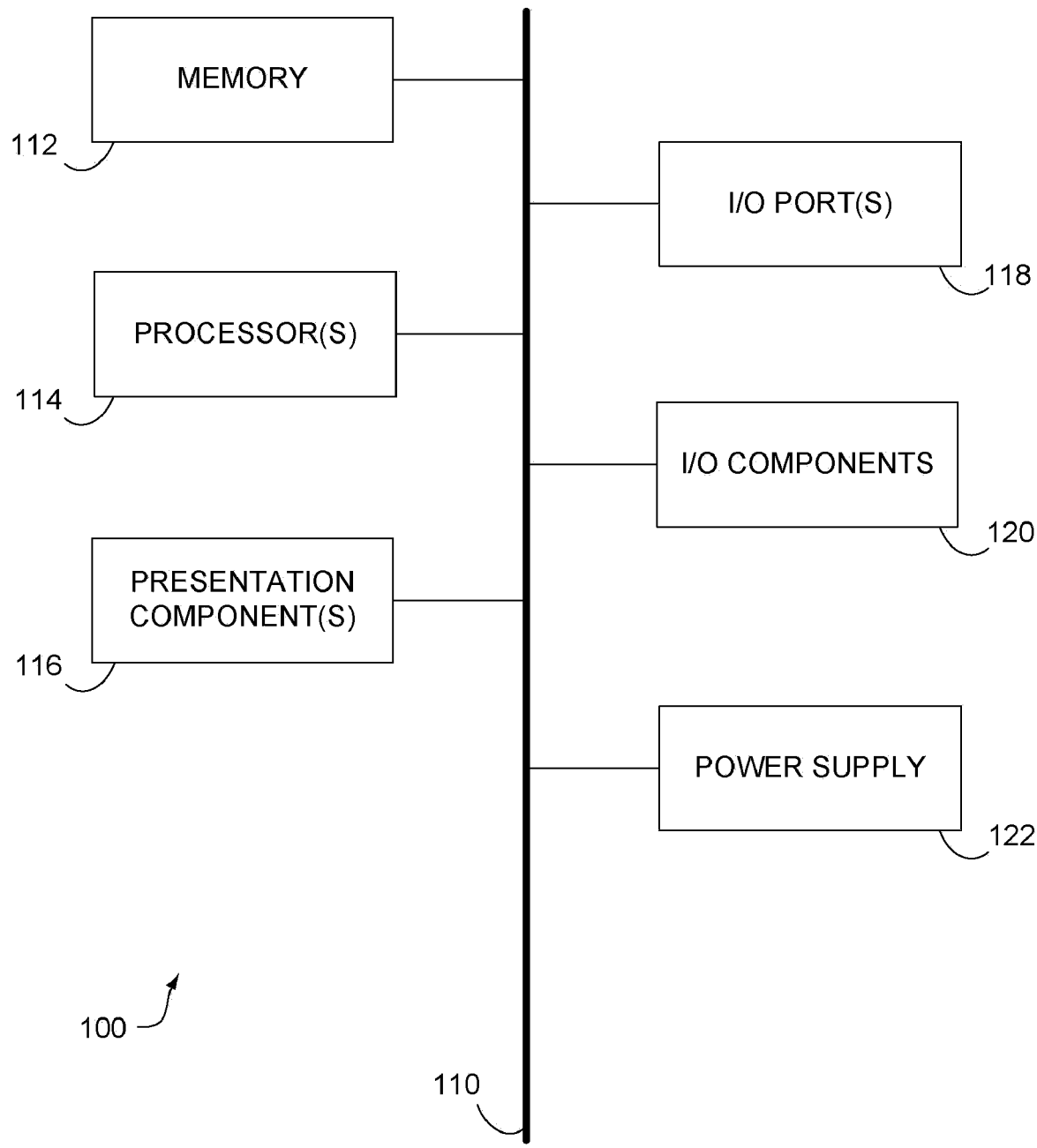
FIG. 1 is a block diagram of an exemplary computing environment suitable for use in implementing the present invention.

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned embodiments of the present invention relate to generating a URL-addressable Web page associated with user-defined search parameters. Utilizing embodiments of the present invention, users may specify search parameters that are packaged together as a single unit and assigned a URL address. Upon accessing the Web page (e.g., by inputting the URL address), the user is presented with an option for inputting a search query. Upon receipt of the search query, the packaged search parameters are appended thereto to create an expanded search query and a search is conducted utilizing the expanded search query. As such, the results returned in response to the search query are more targeted to the user's interests than the results of the same search being conducted utilizing a standard Web search engine. Embodiments of the present invention further relate to sharing packaged search parameters by communicating the URL address assigned thereto.

Figure 2:
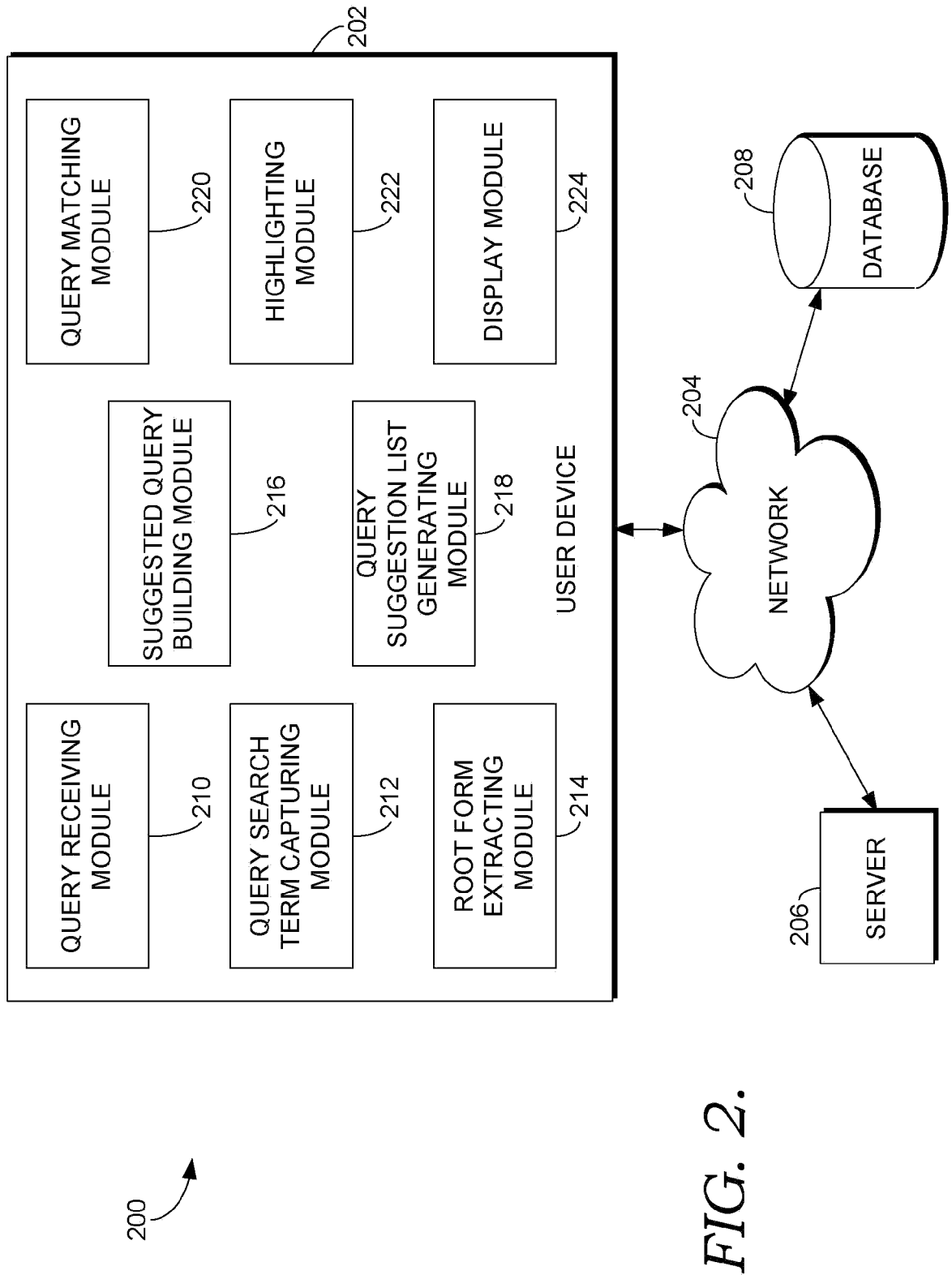
FIG. 2 is a block diagram of an exemplary computing system for generating a suggested query list from a search query, for comparing the search query with the suggested query list and determining matched terms, and for highlighting the unmatched terms, in accordance with an embodiment of the present invention.

Turning now to FIG. 2, a block diagram is illustrated that shows an overall system architecture 200 for generating a URL-addressable Web page utilizing at least one user-defined search parameter in accordance with embodiments of the present invention. It will be understood and appreciated by those of ordinary skill in the art that the overall system architecture 200 shown in FIG. 2 is merely an example of one suitable computing environment and is not intended to suggest any limitation as to the scope of use or functionality of the present invention. Neither should the overall system architecture 200 be interpreted as having any dependency or requirement related to any single component/module or combination of components/modules illustrated therein.

System 200 includes a user device 202 connected to a server 206 and a database 208 via a network 204. Each of the user device 202 and the server 206 shown in FIG. 2 may be any type of computing device, such as, for example, computing device 100 described above with reference to FIG. 1. By way of example only and not limitation, the user device 202 and/or the server 206 may be a personal computer, desktop computer, laptop computer, handheld device, consumer electronic device, and the like. It should be noted, however, that the invention is not limited to implementation on such computing devices, but may be implemented on any of a variety of different types of computing devices within the scope of embodiments of the present invention.

As shown in FIG. 2, the user device 202 includes a query receiving module 210, a query search term capturing module 212, a root form extracting module 214, a query suggestion building module 216, a query suggestion list generating module 218, a query matching module 220, a highlighting module 222, and a display module 224 for implementing embodiments of the invention. In some embodiments, the modules 210, 212, 214, 216, 218, 220, and 222 may be implemented as stand-alone applications. In other embodiments, the modules 210, 212, 214, 216, 218, 220, and 222 may be integrated directly into the operating system for the user device 202. It will be understood by those skilled in the art that the modules 210, 212, 214, 216, 218, 220, and 222 illustrated in FIG. 2 are exemplary in nature and in number and should not be construed as limiting. Any number of modules may be employed to achieve the desired functionality within the scope of embodiments of the present invention.

Figure 8:
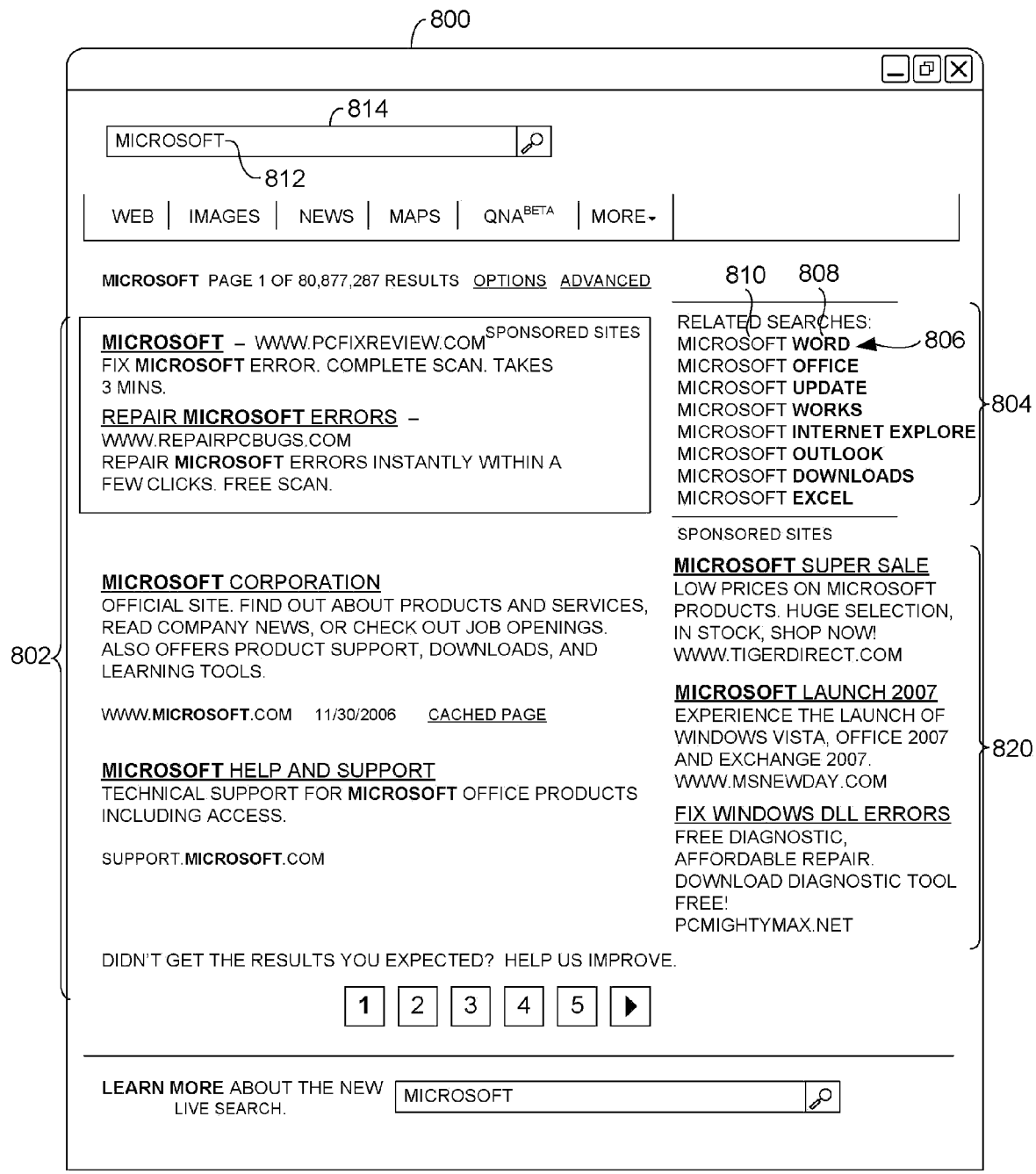
FIG. 8 is an illustrative screen display of an exemplary user interface for receiving a user-defined query, and displaying reverse highlighted terms, in accordance with an embodiment of the present invention.
Figure 9:
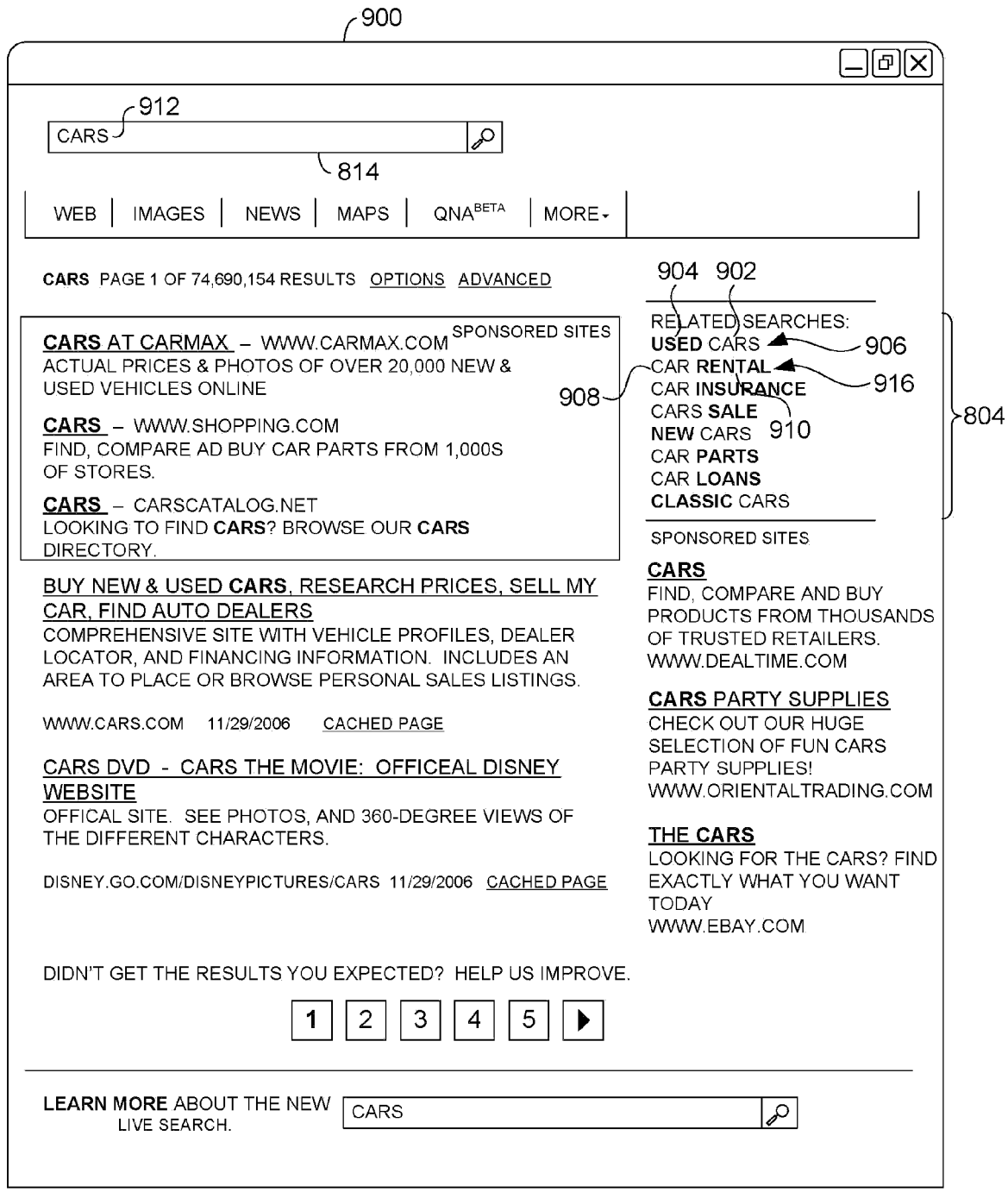
FIG. 9 is an illustrative screen display of an exemplary user interface for receiving a user-defined query, and displaying reverse highlighted terms with a stemming feature incorporated, in accordance with an embodiment of the present invention.
Figure 10:
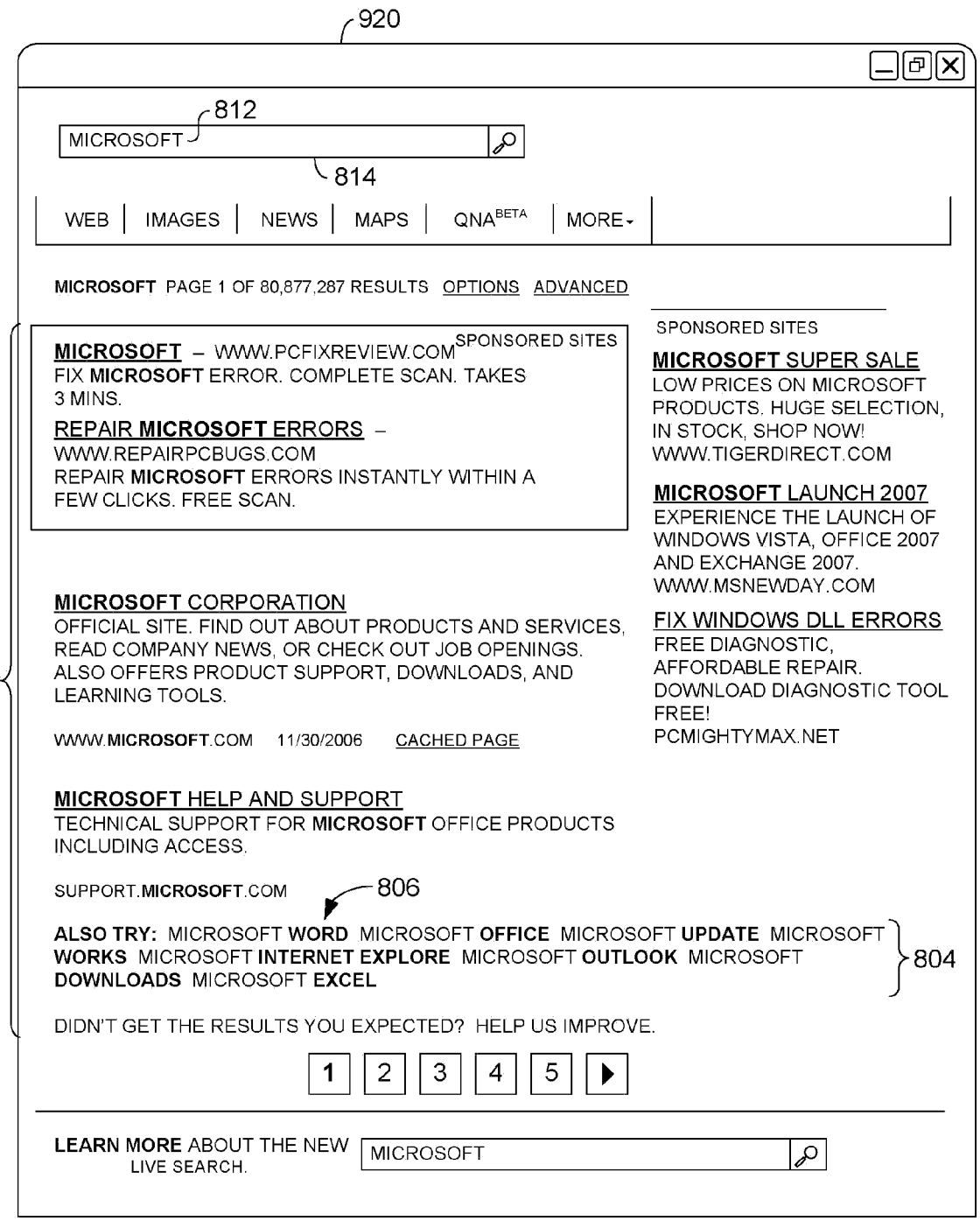
FIG. 10 is an illustrative screen display of an exemplary user interface for displaying reverse highlighted terms, in accordance with an embodiment of the present invention.
Figure 11:
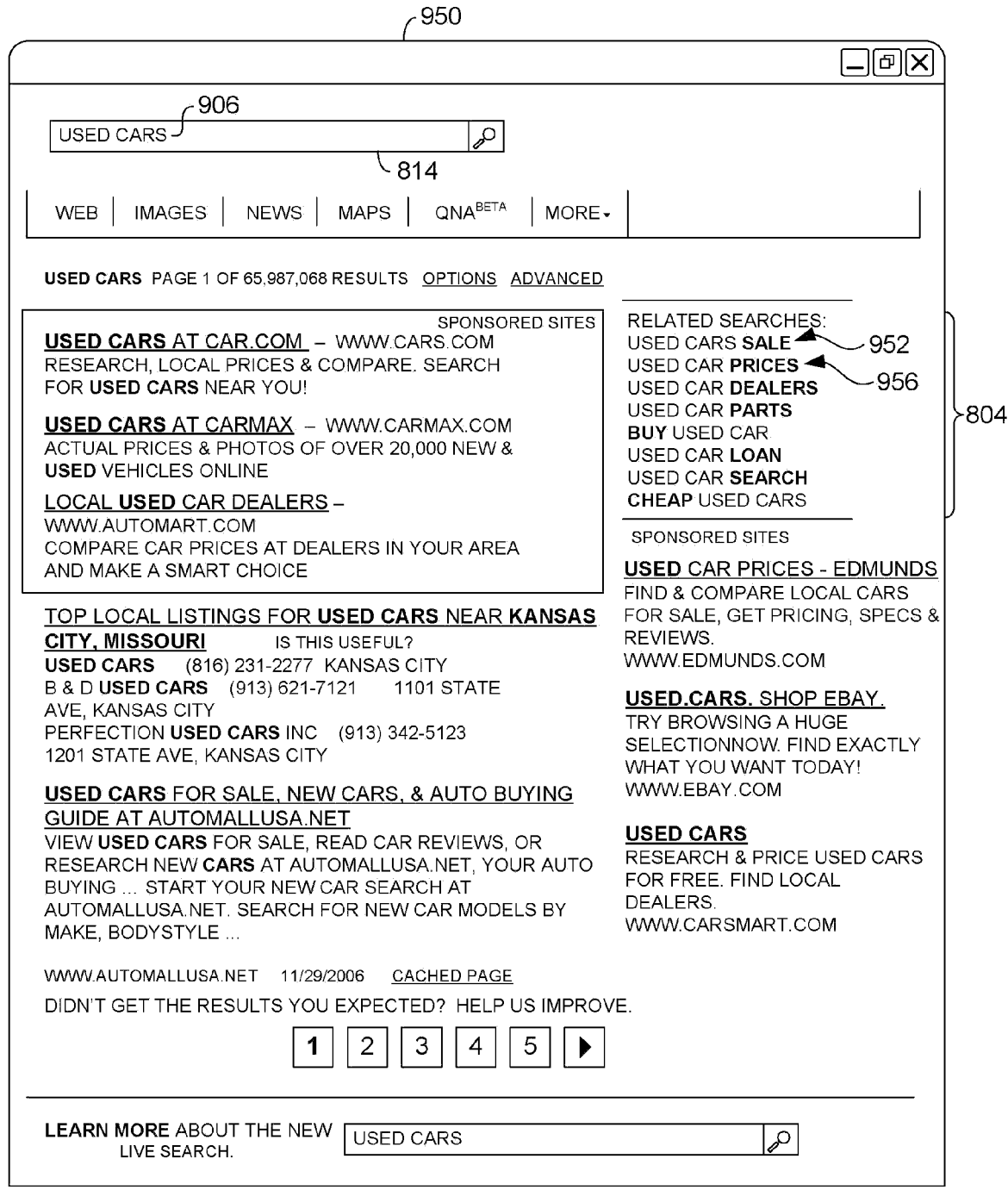
FIG. 11 is an illustrative screen display of an exemplary user interface for displaying a reverse highlighted terms utilizing a suggested search term, in accordance with an embodiment of the present invention.

The query receiving module 210 is configured to receive at least one query search term. By way of example only, suppose a user desires a suggested query list returned in response to a user-defined query of "used cars," e.g., the embodiment illustrated in FIG. 11. In this instance, the user may input the user-defined query at a user interface display. As more fully described below, the user-defined query will be separated into query search terms, e.g., utilizing the capturing module 212, wherein the query search terms are comprised of "used" and "cars." Next, each of the query search terms is received into a front end of the Web browser. It will be understood and appreciated by those of ordinary skill in the art that multiple methods exist by which a user may input the user-defined query into the query receiving module 210. For instance, user-defined queries may be input, by way of example only, utilizing a keyboard, joystick, trackball, touch-pad, or the like. In one embodiment, a user is provided a Web browser as the user interface display, e.g., search results Web page 800 as illustrated in FIG. 8, in which the user may input the user-defined query into an associated query-receiving area 814. Alternative exemplary user interface displays, e.g., search results Web pages 900, 920, and 950, at which a user my input the user-defined query into the query-receiving module 210 are illustrated in FIGS. 9, 10, and 11, respectively.

The query search term capturing module 212 is configured to separate the query search terms associated with a user-defined query. The step of separating the user-defined query utilizes an extraction algorithm that pulls at least one query search term from the user-defined query. Typically, the extraction algorithm parses a complex query into separate query search terms based on spacing between characters. Displaying suggestions based upon the parsed query search terms provides a broader scope within the suggested query list that, in turn, assists the user in refining the initial user-defined query. In addition, if no suggestion are found for the user-defined query or a particular query search term, then the query search terms are filtered, tagged as invalid, and prevented from being passed to the back end. As such, the likelihood that a "no results" message is displayed on the search results Web page is reduced. Upon separating the query search term(s) from the user-defined query and filtering the query search term(s), the query search term capturing module 212 submits the query search terms to the front end of the Web browser.

The root form extracting module 214 is configured to stem the query search term to a root form of the query search term. Typically, the root form extracting module 214 operates within the front end of the Web browser (as more fully described below with reference to FIG. 4). The root form extracting module 214 serves to stem the query search term to an associated root form by way of a stemming algorithm. Searching with the root form benefits the user by providing a more conceptual suggested query list, as opposed to a purely lexical query list. Accordingly, the returned suggested search terms, e.g., provided by query suggestion list generating module 218, are more indicative of the user intent and assist in refining the search criteria. By way of example, under a unique character-string matching algorithm, query search terms "dancing," "dances," "dancer," and "dance" are all separate search query terms even though all conceptually related to the user intent. In contrast, the stemming algorithm extracts the root form of the query search term such that all conceptually related terms are associated with a common root form. Typically, the root form is a unique character-string derived from a portion of the conceptually related terms to which the root form corresponds. By way of example, the root form of the query search term "dance" is "danc." The unique character-string d-a-n-c may be derived from the terms "dancing," dances," and "dancer" as well. As such, the root form extracting module 214 provides search flexibility so that the query search term "dancer" may surface the suggested search term "Dancing with the Stars."

One embodiment of the root form extracting module 214 is a basic stemming algorithm. The basic stemming algorithm extracts the root form by removing the trailing "s" from a search query term; thus, eliminating plurality as a distinction between query search terms. In particular, the basic stemming algorithm will remove the trailing "s" on the conditions that (a) the query search term is more then three characters long, and (b) the query search term does not end in "ss." Accordingly, "bass," has," and "as" would not be stemmed; however, "cars" (e.g., as illustrated in FIGS. 9 and 11) would be stemmed to the root form "car" of the initial query search term.

Another embodiment of the root form extracting module 214 is an advanced Porter stemming algorithm. The Porter stemming algorithm is a fairly aggressive stemmer that extracts the root form referencing a database with a wide variety of stems that occur in English. In operation, the Porter stemming algorithm compares the query search term to the terms within the database until there is a match. The query search term is then replaced by the root form associated with the matched term. As such, the root form extracting module 214 provides more comprehensive search to the user.

Figure 5:
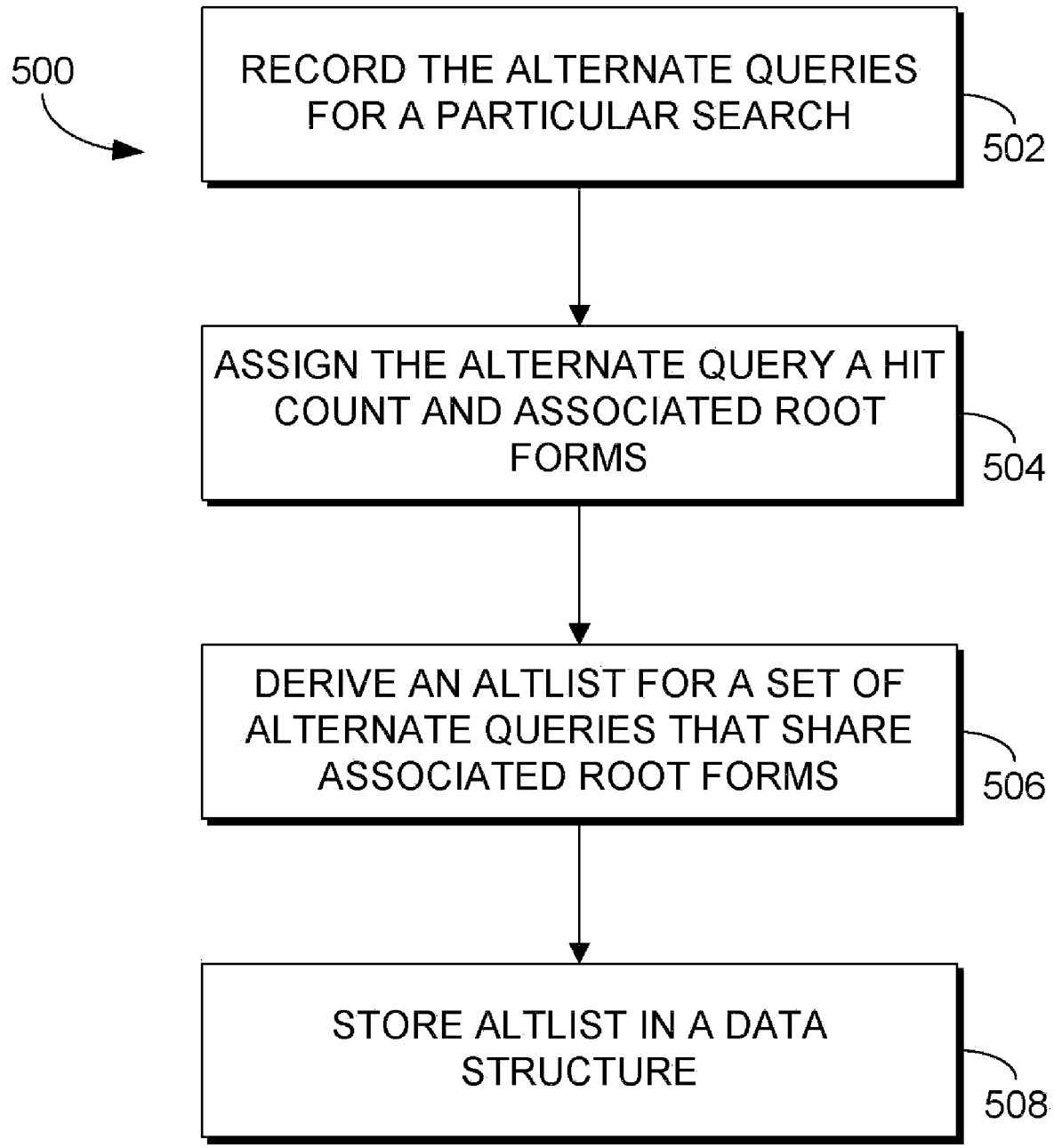
FIG. 5 is a flow diagram showing a method for developing an look-up data structure with a query suggestion builder, in accordance with an embodiment of the present invention.

The query suggestion building module 216 is configured to compile a data structure comprised of one or more alternate queries. The suggested query building module 216 assists in providing suggestions that refine a user-defined query so that more appropriate search results may be returned to the search results Web page. As more fully described below and as illustrated in FIG. 5, the suggested query building module 216 receives alternate queries. The alternate queries are grouped and provided as suggestions for ambiguous user-defined queries. The alternate queries are then sorted according to an associated root form as provided by the root form extracting module 214. The suggested search terms are also assigned a hit count that corresponds to a the search popularity of the associated alternate query. Based upon the search popularity, the suggested search terms are ranked and written to a common list, e.g., look-up data structure, which is a compressed data-structure that packs all the suggestions together neatly and is stored within the data structure in a back-end server. In one instance, the look-up data structure is configured to receive a query as input and return a suggested query list as an output. The suggested query building module 216 is configured to regularly update the look-up data structure to operate more quickly and efficiently.

In one embodiment of the query building module 216, an offline process of normalization is performed prior to generation of the look-up data structure. The step of normalization utilizes a spelling filter tool, a merge operation, and, optionally, adult filtering to filter out all invalid alternate queries. The spelling filter tool ensures that no misspelled alternate queries are offered to the front end of the Web browser. By way of example, a spelling filter tool may compare the alternate queries to the Webster's Dictionary offline database, or in another embodiment, compare the alternate queries to an online lexicon files available at Websites such as Wikipedia.com™. Accordingly, alternate queries that are invalid, e.g., misspelled, may be passed to a spell-correction application that replaces the initial alternate with an associated term as provided by the spelling filter tool. The merge operation is implemented to correct misplaced spaces within the alternate query. In application, an exemplary alternate query "Yahoo mail" may be merged to the more popular spelling "Yahoomail," whereby avoiding all suggestions that involve postal mail and the like. As such, the merge operation provides an alternate query that more accurately reflects user intent. Last, if optional adult filtering is selected, this normalization utility may discard those alternate queries that are associated with adult terms stored in an offline database.

Figure 6:
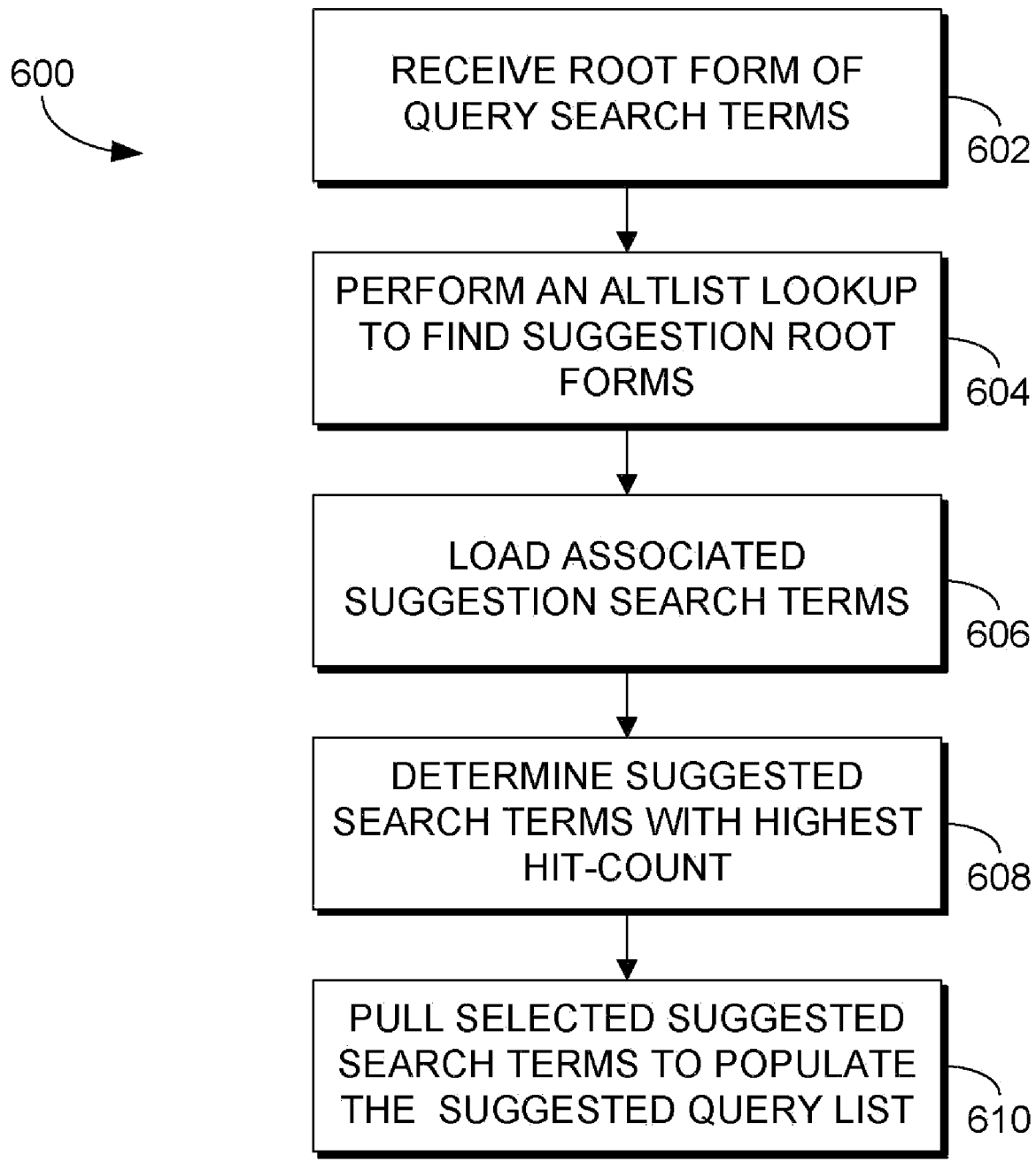
FIG. 6 is a flow diagram showing a method for determining suggested search terms to be incorporated in the suggested query list, in accordance with an embodiment of the present invention.

The query suggestion list generating module 218 is configured to populate the suggested query list with one or more alternate queries from within the data structure. As more fully described below and as illustrated in FIG. 6, the suggested query building module 216 receives alternate queries from the suggested query building module 216. The alternate queries are grouped into a suggested query list and provided as suggestions for ambiguous user-defined queries. By way of example only, if a user input a query of "stock," the associated alternate queries, e.g., utilizing the query suggestion building module 216, would be compiled and included on a suggested query list comprising such entries as "stock car," "stock market," "Christmas stockings," and "steel bar stock."

The embodiment shown in FIG. 9 displays a suggested query list 804 on the search results Web page 900, wherein the suggested search terms "car" of alternate query 906, and "cars" of alternate query 916, are not highlighted. In this embodiment the displayed alternate queries 906, 916, are not highlighted, thus, indicating the application of the stemmed reverse hit-highlighting embodiment.

Figure 7:
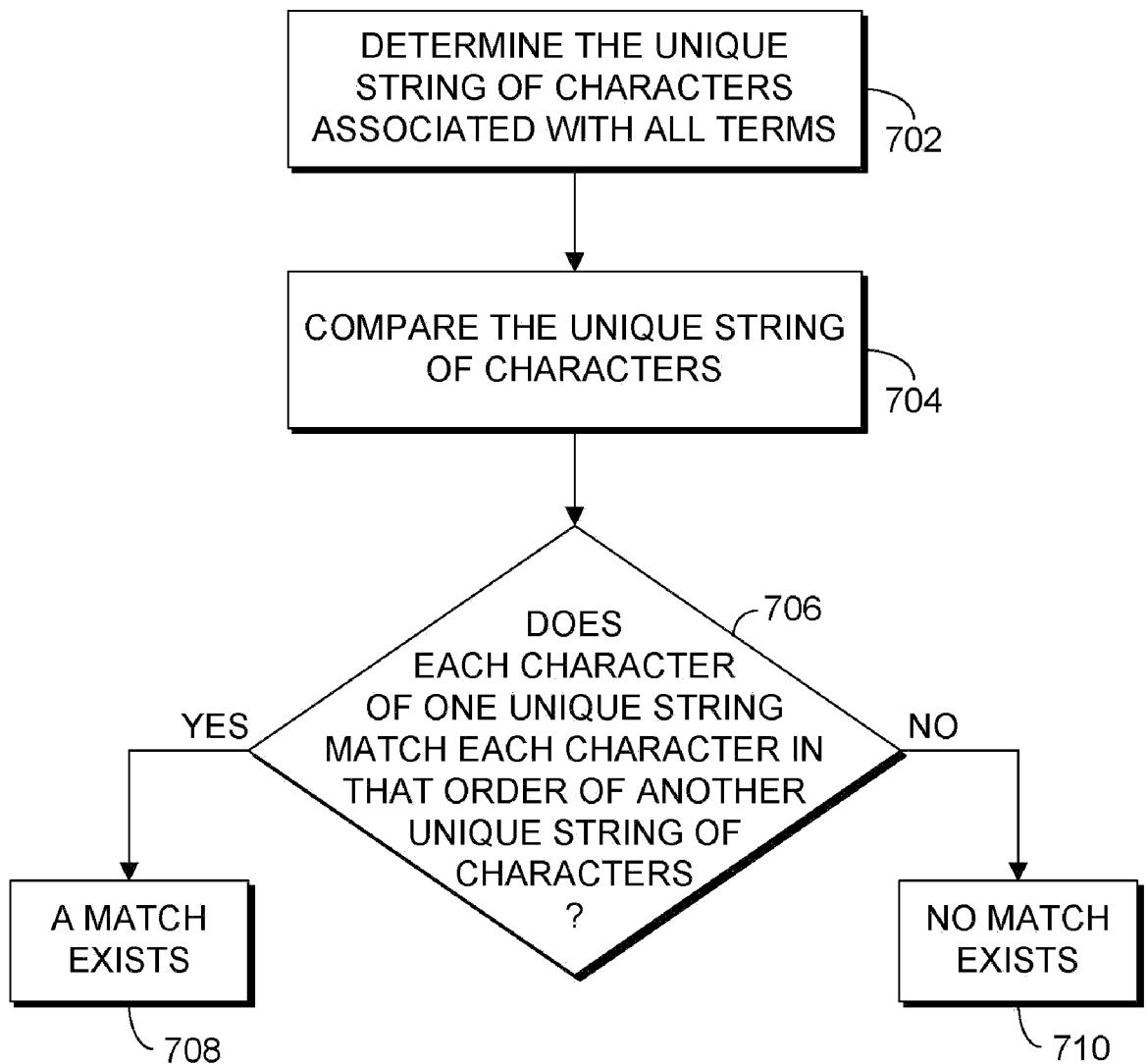
FIG. 7 is a flow diagram showing a method for matching the suggested search terms with the query search terms, in accordance with an embodiment of the present invention.

The query matching module 220 is configured to determine if the at least one query search term and the at least one suggested search term are a match. As more fully described below and as illustrated in FIG. 7, either the root forms of the query search terms and the root forms of the suggested search terms are compared to each other, or the raw query search terms and raw suggested search terms are compared. If it is determined that the unique character-strings of the compared root forms or raw search terms are identical, then a match occurs. In the event that a match occurs, the matched term is isolated from the unmatched terms. In addition, a tag is appended to the those suggested search term that are not isolated to indicated an unmatched term.

The highlighting module 222 is configured to highlight at least one suggested search term that is not a match. In one embodiment, a hyper-text markup language (HTML) body code that resides in the front end of the Web browser reads the tag appended to the suggested search term. If it is determined that the term is tagged, the highlighting module 222 highlights the tagged terms as highlighted text. The highlighted text is displayed within the suggested query list when the suggested query list is rendered on the search results Web page, e.g., display module 224. The highlighted text may be configured such that it is distinguished from other terms being displayed, i.e. underline, bold, italics, other colors, and the like. As a result, the suggested search terms are visually separable from one another to show the significance of the unmatched terms. Accordingly, the user's attention is directed toward what has been upended by the query suggestion list generating module 218, and not the actual search. As such, the highlighting module 222, provides the utility of allowing the user to easily and quickly scan through the relevant suggestions in order to help refine the initial user-defined query.

The display module 224, is configured to display the suggested query list on a search results Web page. As illustrated in FIGS. 8-11, the layout of the search results, advertisements, query-receiving area, suggested query list, and highlighted text with the list are all organized to assist the user in efficiently viewing search results and easily refining the initial user-defined query. This is achieved by prompting the user to select one or more relevant suggested search terms that are visually distinguished from the query search terms that were previously entered by the user. As such, the display module 224 brings the highlighted text, i.e., the text augmented from the initial user-defined search, to the attention of the user and potentially directing the user to a more relevant search result.

Flow Diagrams

Figure 3:
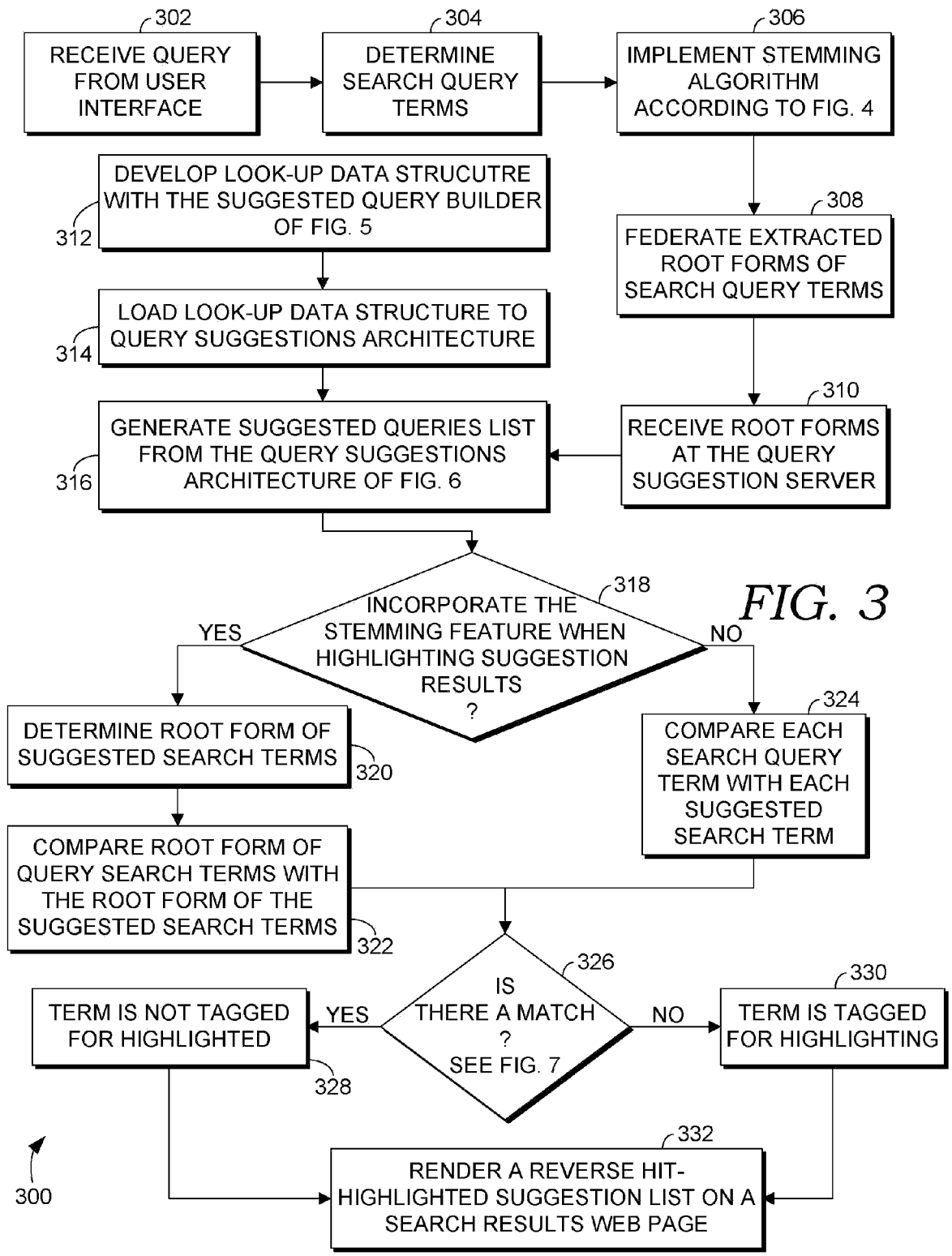
FIG. 3 is a flow diagram showing a method for determining and displaying reverse highlighted terms within the suggested query list, in accordance with an embodiment of the present invention.
Figure 4:
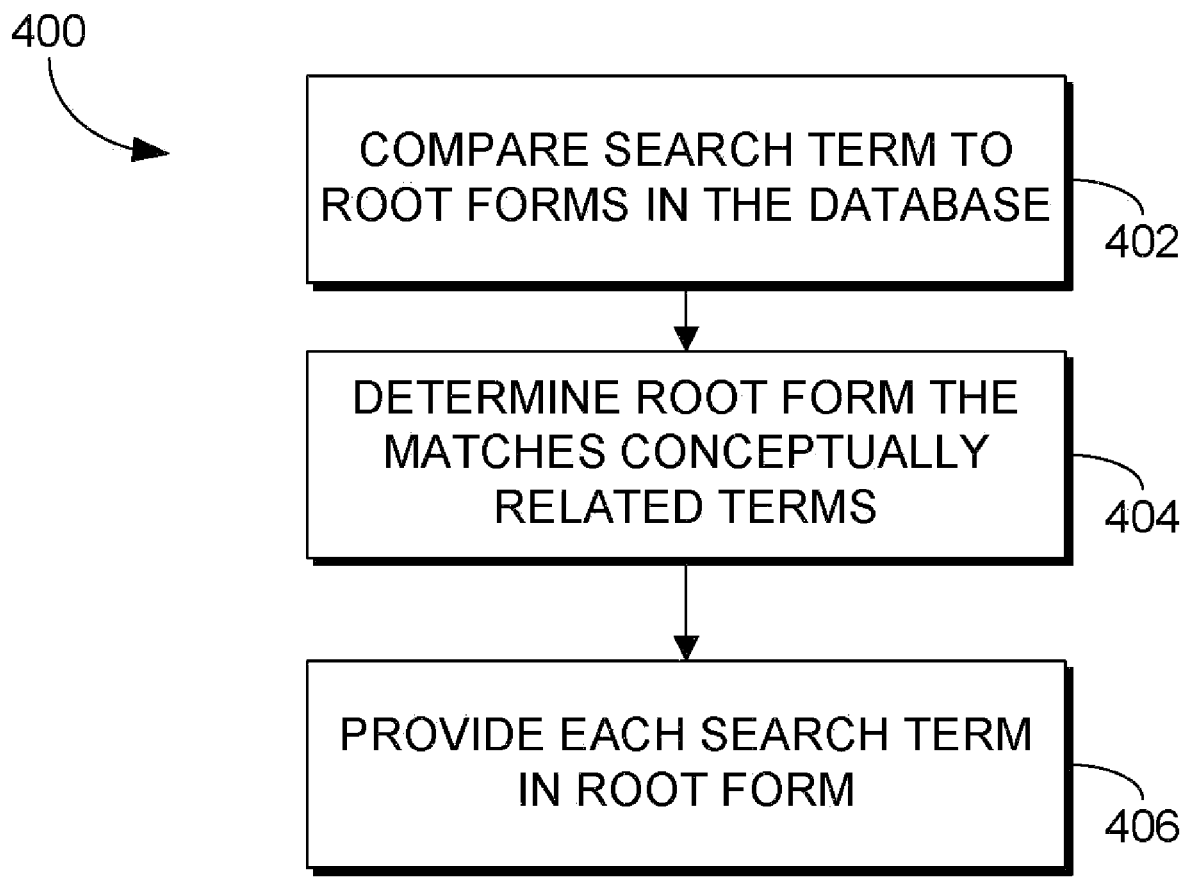
FIG. 4 is a flow diagram showing a method for stemming the query search term, in accordance with an embodiment of the present invention.

Turning now to FIG. 3, a flow diagram is illustrated that shows a method 300 for generating a suggested query list and displaying highlighted text associated with the suggested search terms and dissociated with the query search terms. As indicated at block 302, the user inputs a user-defined query into a query-receiving area at the Web browser, as provided by a user interface display. When the input is complete, a front end of the Web browser receives the user-defined query. The user-defined query is then parsed into separate search query terms, as indicated at block 304. Within the front end of the Web browser a stemming algorithm is implemented in block 306, e.g., providing each search query term in root form at block 406 as illustrated in FIG. 4 to be discussed later.

With further reference to FIG. 3, the front end of the Web browser federates the root form of the query search term to a query suggestion architecture that resides in a back-end server, in block 308. The back-end server supports the query suggestion architecture and a search engine. The present invention relates to federating the root form to the query suggestion architecture such that a suggested query list may be generated. Alternatively, federating to the search engine (i.e., a document retrieval system designed to help find information stored on a computer system or network) provides search results that are displayed on the search results Web page, e.g., search results 802 displayed on search results Web page 800 as illustrated in FIG. 8. The search engine allows a user to request, by inputting a user-defined query, for content meeting a specific criteria and retrieves a list of search results that match those criteria.

Turning to block 316, the suggested query list is generated by query suggestion list generating module 218. To generate the suggested query list, the query suggestions architecture loads from the back-end server data structure a look-up data structure, e.g., hashtable, see block 314, and also receives from the front end a root form of the query search term, see block 310. The look-up data structure is developed by recording alternate queries that are associated with particular root forms and by recording the frequency of hits (i.e., user searches) that are logged for each respective alternate query. As indicated at block 312, the look-up data structure is made available to the query suggestions architecture such that the back-end severs may compare the root forms of the query search terms against the look-up data structure thereby determining the appropriate alternate queries to be compiled into the suggested query list.

With further reference to FIG. 3, the decision block 318 exemplifies the distinction between the reverse hit-highlighting embodiment and the stemmed reverse hit-highlighting embodiment of the present invention. According to block 318, if it is decided to incorporate a stemming feature, then the root form of the query suggestion term is utilized, as indicated at block 322. In this stemmed reverse hit-highlighting embodiment, the root form of the query search terms and the root form of the suggested search terms are compared, see block 322, via the unique character-string method as described above. If, during comparison a match is achieved, as indicated at block 326 and 328, the matched terms are isolated, and the balance of the suggested search terms—the unmatched terms—are appended with a tag. In contrast, those matched suggested search terms within the suggested query list are not appended with a tag, as indicated at block 330. Upon appending the tag to suggested search term, the tagged search term is read by the HTML code body of the front end of the Web browser. The HTML code body performs a highlight operation to all tagged terms such that the tagged suggested search terms are displayed as highlighted text on the search results Web page.

Alternatively, if it is decided not to incorporate the stemming feature when highlighting suggested search terms, then the standard reverse hit-highlighting embodiment is triggered. In this embodiment, the actual query search terms are compared to the actual suggested search terms from the look-up data structure, as indicated at block 324. Again, a match will be determined via the unique character-string method as described above. As will be understood by those skilled in the art, the number of matches in this embodiment is significantly lower than those achieved by the stemmed reverse hit-highlighting embodiment.

Turning to FIG. 4, a flow diagram is illustrated that shows a method 400 for extracting a root form from either a query or suggested search term as performed by the stemming algorithm. As indicated at block 402, the search term is compared to a compilation of terms associated with root forms that are stored in a database on the front end of the Web browser. That is, each set of compiled terms is conceptually related and is identified by an associated root term. When a match is achieved between the search term and a compiled term within a particular set, the root form that is associated with the set of compiled terms will replace the search term, as indicated at blocks 404 and 406. In one embodiment, the search term is a query search term, wherein the replacement root form is federated to the query suggestions architecture. In another embodiment, the search term is a suggested search term and provided to the front end of the Web browser to be compared by the query matching module 220.

With reference to FIG. 5, a flow diagram is illustrated that shows a method 500 for building a suggested query list, or look-up data structure, from one or more alternate queries. The alternate queries represent previous user-defined queries input into a Web browser by one or more online users. The alternate queries are sorted by the a unique character-string that is inherent to the characters of the alternated query. The alternate queries with matching unique character-strings are grouped together and written to an look-up data structure, as indicated in block 502. The common unique character-string of the set of alternate queries corresponds to a particular root form. The particular root form is assigned to the look-up data structure to which the corresponding alternate queries are written, thus, identifying the contents of the look-up data structure by the root form.

In addition to recording online alternate queries, an offline alternate query may be manually entered into the look-up data structure. For instance, a synonym may be entered that would normally not have the a matching unique character-string to others alternate queries in the look-up data structure, e.g., entering "handbag" for an look-up data structure with variations on the term "purse." By providing offline alternate queries, the look-up data structure may broadened in scope such that the suggested query list is more comprehensive and relevant for the user.

As indicated at block 504, the alternate queries written to a particular look-up data structure are assigned a hit count. The hit count is derived from a record of the number of users that have searched a particular term, which represents the popularity of the query, i.e., a high frequency of searches corresponds to a more popular alternate query. The record is formed by counting the number of times a specific alternate query hit in a cache at the back-end servers.

When deriving the look-up data structure, as indicated in block 506, the alternate queries with a higher assigned hit count are assigned a high ranking. By way of example, an look-up data structure with the assigned root form of "rainier" may include the alternate queries "Mt. Rainier" and "Rainier Industries." Assuming a large number of users have input "Mt. Rainier" as a user-defined query, as opposed to those researching "Rainier Industries," the alternate query "Mt. Rainier" will be assigned a higher ranking upon deriving, or updating, the look-up data structure.

A data structure within the query suggestions architecture of the back-end servers maintains and stores all the look-up data structures associated with each respective root form, as indicated in block 508. In one embodiment, a maximum of ten alternate queries are stored in an look-up data structure, the retained ten alternate queries having the highest ten hit counts of the associated set.

With reference to FIG. 6, a flow diagram is illustrated that shows the method 600 for populating the suggested query list.

As indicated at block 602, the suggested query builder module 218 receives the root form of the query search term as stemmed by the root form extracting module. Within the back-end servers, the query suggestions architecture compares the root form with the root form associated with the stored look-up data structures, as indicated at block 604. When a match is found, the associated alternate queries written to the corresponding look-up data structure are loaded into a queue. The suggested query builder module 218 determines the hit count of the alternate queries in the queue, as indicated at block 608, and pulls those with the highest hit count, i.e., highest popularity, to populate the suggested query list. The completed suggested query list is then federated to the front end of the Web browser.

As depicted in FIG. 7, a flow diagram showing a method 700 for comparing terms and determining if there is a match is shown in accordance with an embodiment of the present invention. As indicated at blocks 702 and 704, the unique character-strings of the query search terms and the suggested search terms are determined and compared. As indicated at block 706, if each and every character of the suggested search term character-string directly corresponds with each and every character of the query search term character-string, then a match occurs, see block 702. If one or more characters do not correspond, then no match exists, see block 710.

Exemplary User Interfaces

Turning now to FIGS. 8-11, illustrative screen displays of exemplary user interfaces for accepting query search terms and displaying suggested search terms are shown in accordance with embodiments of the present invention. In FIG. 8, a search result Web page is shown that has been created by inputting a user-defined query of "Microsoft™". In FIG. 9, a search result Web page is shown that has been created by inputting a user-defined query of "cars." In FIG. 10, a search result Web page is shown that has been created by inputting a user-defined query of "Microsoft™", wherein an alternate embodiment of the suggested query list is provided by the user interface display. In FIG. 11, a search result Web page is shown that has been created by inputting a user-defined query of "used cars" as refined from the search performed in FIG. 8.

Referring to FIG. 8, the search results Web page 800 is a listing of Web pages 802 returned by the search engine in response to a user-defined query 812 input into a query-receiving area 814. The results normally include a list of Web pages 802 with titles, a link to the page, and a short description. Typically, within the short description, query search terms that match terms in the short description are highlighted to indicate to the user where the user-defined query 812 has matched the content of the page. In addition, the search results Web page 800 may contain advertisements 820, which are a way for search engines to earn income. As is understood by those skilled in the art, the location of the suggested query list 804 and the number of alternate queries 806 in the list may vary according to user preference, website designer preference, etc. As is also understood by those skilled in the art, the use of colored text, hyperlinks, underlining, font sizes, and alternate distinguishing techniques may be utilized to highlight text.

The embodiment shown in FIG. 8 displays a suggested query list 804 on the search results Web page 800, wherein the suggested query list 804 is in list format and located on a right side of the Web page 800. The suggested query list 804 is comprised of a plurality of alternate queries 806, which are in turn comprised of at least one suggested search query, 810 and 808. As can be seen, the displayed suggested search terms, 808, 810, are highlighted according to the standard reverse hit-highlighting embodiment. In this embodiment the actual query search term of the user-defined query 812 matches the actual suggested search term in order to suppress providing the suggested search term as highlighted text. As such, the actual suggested search term 810 match of "Microsoft™" is not highlighted, but any other suggested search term 808 or variation of the term "Microsoft™" would be highlighted.

The embodiment shown in FIG. 9 displays a suggested query list 804 on the search results Web page 900, wherein the suggested search terms "car" of alternate query 906, and "cars" of alternate query 916, are not highlighted. In this embodiment the displayed alternate queries 906, 916, are not highlighted, thus, indicating the application of the stemmed reverse hit-highlighting embodiment. That is, the root form of the query search term of the user-defined query 912 matches the root form of the suggested search term in order to suppress providing only the upended suggested search terms, 902, 908, as highlighted text. Accordingly, the suggested search terms, 904, 906, that do not share the same root are highlighted to provide the user an efficient way to scan upended search suggestions. As such, the stemmed reverse hit-highlighting embodiment only highlights text that is distinct from the initial user-defined search.

The embodiment shown in FIG. 10 displays a suggested query list 804 on the search results Web page 920, wherein the suggested query list 804 is displayed at the bottom rail of the Web page 920 and after the end of the search results 802. The alternate queries 806 are allowed to wrap around between lines and are separated for clarity. As is understood by those skilled in the art, the separation of the alternate queries 806 may be achieved by a plurality of techniques, these techniques include, but are not limited to, the following: spacers, bullets, dashes, symbols, or characters. This alternate embodiment exemplifies the ability to present the suggested query list in various locations on the search results Web page 920.

The embodiment shown in FIG. 11 displays a suggested query list 804 on the search results Web page 920, wherein the suggested query list 804 is derived from user-defined query "used cars." The input of user-defined query 906 "used cars" is automatically input into query-receiving area is upon the user selecting an alternate query from the suggested query list 804, e.g., selecting alternate query 906, as shown in FIG. 9. The search is performed and a further refined suggested query list 804 is returned. Accordingly, alternate queries 952 and 956 narrow the search field per user intent while only highlighting text that is upended, as opposed to text that is input as a user-defined query. As such, the latest suggested search terms are brought to the user's attention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-storage media having computer-executable instructions embodied thereon that, when executed by a processor, perform a method for highlighting at least one suggested search term utilizing at least one query search term, the method comprising:

receiving the at least one query search term;

automatically generating a suggested query list, the suggested query list being associated with the at least one query search term, wherein the suggested query list is comprised of the at least one suggested search term;

stemming the at least one query search term to a root form thereof, wherein the root form is a character-string derived from conceptually related terms;

stemming the at least one suggested search term to a root form thereof, determining if the root form of at least one query search term and root form of the at least one suggested search term are a match; and highlighting only the at least one suggested search term that is not a match, wherein highlighting comprises visually distinguishing the at least one unmatched suggested search term from other terms in the suggested query list, and wherein highlighting and bring a user's attention to the at least one unmatched suggested search term.

2. The media of claim 1, further comprising:

determining if the root form of the at least one query search term and the at least one suggested search term are a match; and highlighting the at least one suggested search term that is not a match.

3. The media of claim 1, further comprising:

appending a tag to the at least one suggested search term that is not a match; and displaying the least one suggested search term with the tag associated therewith as a highlighted text.

4. The media of claim 3, wherein a bold font is imposed on the highlighted text.

5. The media of claim 3, wherein an italicized font is imposed on the highlighted text.

6. The media of claim 1, further comprising:

compiling a data structure comprised of alternate queries from other users, wherein each alternate query is comprised of the at least one suggested search term; and populating the suggested query list with the alternate queries from the data structure.

7. The media of claim 1, further comprising displaying a search results Web page with the suggested query list.

8. The media of claim 7, wherein the displayed suggested query list includes the highlighted text.

9. The media of claim 7, wherein the search results Web page has a Hyper Text Markup Language (HTML) body code, the HTML body code is configured to display the at least one suggested search term with a tag associated therewith as highlighted text.

10. A computer system for generating suggested query list with highlighted text utilizing at least one query search term, the system comprising:

a query receiving module configured to receive the at least one query search term;

a query suggestion list generating module configured to generate the suggested query list, wherein the suggested query list being associated with the at least one query search term, the suggested query list having at least one suggested search term;

a root form extracting module that utilizes a stemming algorithm to perform the following operations:

(a) stemming the at least one query search term to a root form thereof, wherein the root form is a character-string derived from conceptually related terms; and (b) stemming the at least one suggested search term to a root form thereof a query matching module configured to determine if the root form of the at least one query search term and the root form of the at least one suggested search term are a match; and a highlighting module configured to highlight in a display the at least one suggested search term that is not a match, wherein highlighting comprises visually distinguishing the at least one unmatched suggested search term to indicate significance of the at least one unmatched suggested search term and to direct a user's attention thereto.

11. The computer system of claim 10, further comprising a query search term capturing module configured to separate and normalize the at least one query search term associated with an initial query text as input by a user.

12. The computer system of claim 10, further comprising a query suggestion building module configured to compile a data structure comprised of one or more alternate queries, the alternate queries being input by a previous user.

13. The computer system of claim 12, wherein the query suggestion list generating module is configured to populate the suggested query list with the one or more alternate queries, the one or more alternate queries being located within the data structure.

14. The computer system of claim 10, further comprising a display module configured to display the suggested query list in Web page and the highlighted at least one suggested search term that is not a match within the suggested query list, wherein a layout of the Web page governs how search results, advertisements, a query-receiving area, the suggested query list, and the highlighted at least one suggested search term within the suggested query list are organized.

15. The computer system of claim 14, wherein the suggested query list includes highlighted text that is associated with the at least one suggested search term that is not a match.

16. A computerized method for highlighting at least one suggested search term associated with at least one query search term, the method comprising:

receiving the at least one query search term at a query receiving area;

populating a suggested query list from a data structure with the at least one suggested search term, wherein the at least one suggested search term is relevant to the at least one query search term;

stemming the at least one query search term to a root form thereof, wherein the root form is a character-string derived from conceptually related terms;

stemming the at least one suggested search term to a root form thereof, determining if the root form of at least one query search term and the root form of at least one suggested search term are a match;

highlighting the at least one suggested search term that is not a match, wherein highlighted the at least one unmatched suggested search term visually distinguishes the at least one unmatched query search term from other terms within the suggested query list and prompts a user to select the highlighted at least one suggested search term; and upon receiving and indication of a user-selection of the highlighted at least one suggested search term, automatically inputting into the query-receiving area the at least one unmatched suggested search term, wherein a search performed on the at least one query search term, in conjunction with the inputted at least one unmatched suggested search term, further refines the suggested query list.

17. The computerized method of claim 16, wherein highlighting the at least one suggested search term that is not a match comprises:
   appending a tag to the at least one suggested search term that is not a match; and
   displaying a search results Web page with the at least one suggested search term with a tag associated therewith as highlighted text.

18. The computerized method of claim 17, wherein a font, distinctive from the fonts displayed on the search results Web page, is imposed on the highlighted text.

19. The computerized method of claim 16, further comprising:
   assigning a hit count to the at least one suggested search term, wherein the hit count corresponds to a search popularity of queries associated therewith; and
   based on the assigned hit count, organizing the at least one suggested search term within the suggested query list.

20. The computerized method of claim 16, further comprising sorting the at least one suggested search term within the suggested query list in accordance with the root form of the at least one suggested search term.

\* \* \* \* \*